United States Patent
Pruyne et al.

(10) Patent No.: US 8,825,610 B1
(45) Date of Patent: Sep. 2, 2014

(54) SYSTEM MANAGEMENT BASED ON GOALS RELEVANT TO A CURRENT STATE OF A MANAGED SYSTEM

(75) Inventors: James C. Pruyne, Naperville, IL (US); Akhil Sahai, Santa Clara, CA (US); Subramoniam N. Iyer, Newark, CA (US); Keith Farkas, San Carlos, CA (US); Sven Graupner, Mountain View, CA (US); Vijay Machiraju, Hyderbad (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 645 days.

(21) Appl. No.: 11/829,792

(22) Filed: Jul. 27, 2007

(51) Int. Cl.
*G06F 7/00* (2006.01)
*G06F 17/00* (2006.01)

(52) U.S. Cl.
USPC .......................... 707/694; 707/661; 707/689

(58) Field of Classification Search
USPC ........................................................ 707/790
See application file for complete search history.

(56) References Cited

U.S. PATENT DOCUMENTS

| 6,732,168 | B1 * | 5/2004 | Bearden et al. | 709/223 |
| 2006/0265583 | A1 * | 11/2006 | Eilam et al. | 713/100 |
| 2008/0235506 | A1 * | 9/2008 | Eilam et al. | 713/100 |

OTHER PUBLICATIONS

Integration Guide, "HP Change Management Suite" (Jun. 2007).
http://h20229.www2.hp.com/products/radia_patm/index.html
"Configuration Management CM Patch Manager" (Downloaded Jul. 23, 2007).

* cited by examiner

*Primary Examiner* — Robert Beausoliel, Jr.
*Assistant Examiner* — Susan F Rayyan

(57) ABSTRACT

A system includes a goal state repository, a goal state repository instance and management tools. The goal state repository stores goals for a managed system. The goal state repository instance stores a subset of the goals applicable to a current state of the managed system. The goal state repository instance is created by comparing the current state of the managed system to the goals stored in the goal state repository. The management tools modify the managed system to be in compliance with the subset of goals stored in the goal state repository instance.

20 Claims, 4 Drawing Sheets

SYSTEM MANAGEMENT BASED ON GOALS RELEVANT TO A CURRENT STATE OF A MANAGED SYSTEM

BACKGROUND

A common component of computer management systems is the configuration management database (CMDB). The CMDB typically acts as a central repository for all information about the system being managed. There is typically no mechanism provided for creating a view on the CMDB supporting only currently, relevant information, such as only information relevant to the current state of the system being managed. Because of this, management tools cannot effectively use the CMDB as a communication and coordination mechanism because any partial updates they perform would be considered by other entities, such as users, to be the authoritative state on the system, not a state which represents the partial solution to a high-level management goal. Furthermore, tools which update the CMDB, but then fail to complete their intended purpose, could leave the CMDB in an inconsistent state.

Lacking this coordination method, management systems tend to be built in a more monolithic way. That is, one piece of code is developed which performs a complete management function. However, software engineering practices have shown repeatedly that systems which decompose a large problem into smaller, composable modules are easier to maintain, are less error prone, and are more flexible and can more rapidly be applied to solving new problems as they arise.

SUMMARY

A system includes a goal state repository, a goal state repository instance and management tools. The goal state repository stores goals for a managed system. The goal state repository instance stores a subset of the goals applicable to a current state of the managed system. The goal state repository instance is created by comparing the current state of the managed system to the goals stored in the goal state repository. The management tools modify the managed system to be in compliance with the subset of goals stored in the goal state repository instance.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

Figure 1:
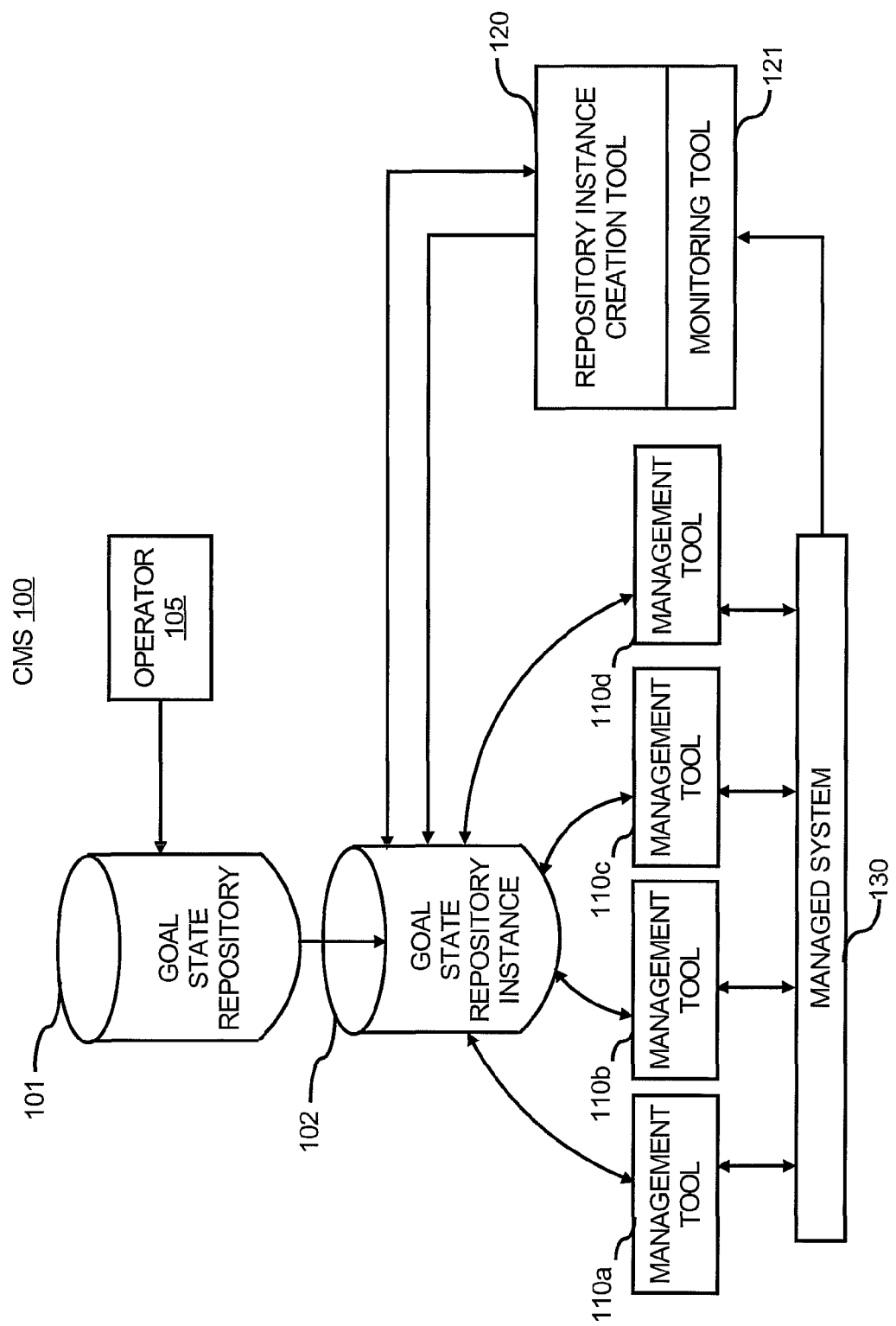
FIG. 1 illustrates a goal-based compliance management system, according to an embodiment.

For simplicity and illustrative purposes, the principles of the embodiments are described. However, one of ordinary skill in the art would readily recognize that the same principles are equally applicable to, and can be implemented using variations of the described embodiments.

According to an embodiment, a goal-based compliance management system (CMS) is operable to automatically manage a system based on a current state of the system and stored goals for the system being managed, referred to as the managed system. The goals are objectives the managed system has been tasked with achieving. The goals are stored in a goal state repository.

The CMS identifies the stored goals that are applicable to the current state of the managed system and modifies the managed system to be in compliance with the applicable goals. The identified goals are identified based on the present time and/or the present conditions of the managed system, which describe the current state of the managed system. The CMS creates a goal state repository instance to store the identified goals that are applicable to the current state of the managed system. The identified goals may be goals retrieved from the goal state repository. In many instances, not all the goals stored for the managed system in the goal state repository will be applicable to the current state of the managed system, so the identified goals stored in the goal state repository instance may be a subset of the goals stored in the goal state repository. Other goals stored in the goal state repository instance may not have a direct correspondence to any particular goal in the goal state repository because they may be computed or otherwise derived from the current state of the managed system.

The goal state repository instance is created when the managed system is to be brought in compliance with the stored goals, and then the goal state repository instance may be deleted when management functions have been completed or when a failure is encountered. The creation and deletion of the goal state repository instance may be performed periodically. This avoids having to store unneeded state information for the managed system as well as providing a simple mechanism for dealing with failures associated with managing the managed system.

According to an embodiment, the CMS includes a set of management tools for managing the managed system and bringing the managed system in compliance with the applicable goals. Each of the management tools shares the global state repository instance to modify a portion of the managed system for bringing it in compliance with the goals in the global state repository instance. Each of the management tools may be independent from the other management tools and may be operable to modify a portion of the managed system. Each of the management tools may be responsible for a subset of the goals in the global state repository instance and are designed to operate on a portion of the managed system. The tools may or may not communicate with each other, but the tools may operate in a workflow specified by an operator. The workflow may specify precisely which tools, and in the sequence the tools need to be executed to perform all of the steps needed to bring the managed system in compliance with the goals in the global state repository instance.

The management tools are loosely coupled, for example, in a workflow, which allows a designer to create the management tools in a manner that makes them small and therefore simple and less prone to error while also providing a means of generating powerful management systems from many of these smaller tools. Because the tools communicate indirectly through the instance repository, tools may be combined in an arbitrary manner while still permitting the tools to cooperate to achieve a desired goal state.

The CMS provides a single repository in which all goals can be stored, and the ability to identify or compute the applicable goals at any point in time based on the information stored in the global repository. This provides the flexibility of multiple goals for various conditions, but also eliminates the need to explicitly store the goals for these conditions which saves in required storage space as well as in any difficulties that might arise from keeping multiple repositories which need to be synchronized when changes occur. It also provides an operator with a single point of viewing and updating goals which may be changing over time and circumstances.

FIG. 1 illustrates the CMS 100 according to an embodiment. The CMS system 100 includes a goal state repository 101, a goal state repository instance 102, management tools 110*a-d*, a repository instance creation tool 120 and a monitoring tool 121 for managing the managed system 130.

The goal state repository 101 stores the goals for the managed system 130. In one embodiment, the goal state repository 101 stores all the goals for the managed system 130, and operates as a single view for an operator 105 to view, update and otherwise manage the goals for the managed system 130. The goals stored in the goal state repository 101 may be created and stored by the operator 105 in the repository or the goals may be machine generated and stored in the repository. The goals are objectives the managed system 130 has been tasked with achieving. The goals can be arbitrary or specific. Examples include specific allocations of computing resources, such as "6 servers of type X allocated to serving application A," or more abstract, such as "Web Server Y should return web pages within 1 second."

Periodically, the CMS 100 performs operations to attempt to bring the managed system 130 in compliance with the applicable goals stated in the goal state repository 101. To do so, the CMS 100 first creates an instance of the goal state repository 101. The instance is the goal state repository instance 102. This is done by choosing or computing the goals from the goals in the goal state repository 101 that are applicable at the present time or under the present conditions of the managed system 130. In this way, the goal state repository instance may be considered to be a sub-set of the goal state repository 101, though at least some of the content of the goal state repository instance 102 may not have a direct correspondence to any goal in the goal state repository 101 because at least some of the goals in the goal state repository instance 102 may be computed or otherwise derived from the present state of the managed system.

The repository instance creation tool 120 creates the goal state repository instance 102 based on the present time or the present conditions of the managed system 130, referred to as the current state of the managed system 130. To determine the current state of the managed system 130, the monitoring tool 121 monitors metrics for the managed system as well as the present time. The metrics may correspond to the type of managed system and/or the goals in the goal state repository 101. Examples of the metrics include web server response time, number of servers allocated to an application, etc.

The repository instance creation tool 120 creates the goal state repository instance 102 by comparing the current state of the managed system 130 with the goals in the goal state repository 101 to determine the applicable goals from the goal state repository 101. The applicable goals are the goals that are applicable to the current state of managed system 130, i.e., a subset of the goals in the goal state repository 101 and computed goals. For example, the repository instance creation tool 120 periodically creates the goal state repository instance 102 by comparing the present time with predetermined times, based on periodic intervals, to determine whether to start the process of creating the goal state repository instance 102.

In another example, the repository instance creation tool 120 compares the metrics monitored by the monitoring tool 121 with the goals in the goal state repository 101. If any of the metrics are not compliant with the goals then the goals are considered applicable. For example, if the goal is web server response time less than 3 seconds, and the monitored metrics indicate that the response time is averaging 5 seconds, then that goal is considered an applicable goal.

Some of the goals may be computed from the current state. For example, if the current state of the system is in an error, analysis of that error can lead to identify a goal statement that eliminates the cause of that error.

These applicable goals are stored in the goal state repository instance 102. Thus, the creation of the goal state repository instance 102 comprises identifying or determining the applicable goals based on the present state of the managed system and storing the applicable goals in a repository. The goal state repository instance 102 may be a physically separate repository from the goal state repository 101, such as a separate database or separate memory locations, or the goal state repository instance 102 may be a logically separate repository from the goal state repository 101. For example, a single database is used to store information for both repositories 101 and 102, except, some of the goals are flagged as being part of the goal state repository instance 102.

The repository instance creation tool 120 is also operable to discard the goal state repository instance 102, for example, when modifications to bring the managed system in compliance with the applicable goals is complete or a failure is detected. In this way, subsequent executions begins with the step of creating a goal state repository instance as described above, and that instance will be consistent with the current time and conditions of the management system. Further, if the execution of tools should fail, or otherwise determine that it is not possible to bring the managed system 130 in compliance with the applicable goals, there is no need to restore the goal state repository 101 to some initial state because the instance repository will be deleted and re-created on the next invocation.

After the repository instance creation tool 120 creates the goal state repository instance 102, the management tools 110 bring the managed system 130 in compliance with the applicable goals in the goal state repository instance 102. The management tools 110 are a set of management tools 110*a-d*, and each of the management tools may be responsible for bringing the managed system 130 in compliance with a subset of the goals in the goal state repository 101 and the goal state repository instance 102. Four management tools 110*a-d* are shown by way of example, and the CMS 100 may include more or less management tools.

Each of the management tools 100 shares the global state repository instance 102 to modify a portion of the managed system 130. The management tools 110 may or may not communicate with each other, but the management tools 110 may operate in a workflow specified by an operator. The workflow may specify precisely which tools, and the sequence the tools need to be executed to perform all of the steps needed to bring the managed system in compliance with the goals in the global state repository instance.

As described above, each of the management tools 110 may be responsible for bringing the managed system 130 in compliance with a subset of the applicable goals, and each operates in a similar manner to modify the managed system 130. Each of the management tools 110 performs a differencing operation for the subset of the goals the tool is concerned with. The differencing operation determines whether the current state of the managed system 130 is not complying with the subset of goals. For example, the management tool compares metrics captured in the current state of the managed system with the subset of goals. If the metrics are not in compliance with the goals, then the managed system is modified. The differencing operation may be facilitated by using a common model to represent both the goals as well as the current state of the managed system. The model allows the goals and the managed system state to be described using the same parameters and in the same syntax so the goals can be easily compared to the current system state.

One or more of the management tools 110 may modify the managed system 130 to bring it in compliance with the applicable goals. To do so, the management tools 110 may create, modify or remove entries from the goal state repository instance 102. For example, the management tool 110 may be used in a resource-on-demand system to provide computer resources for applications from a pool of resources. The management tool 110a determines the types or quantities of computer resources that are presently needed to place managed system in compliance, but does not determine precisely which available computer resources from the pool to select at this time. The management tool 110a creates entries in the goal state repository instance 102 indicating the need for the particular types and quantities of resources to be selected. Then, one or more of the management tools 110b-d select computer resources from the pool of resources that satisfy the criteria of the entries created by the management tool 110a, and provision those resources for the managed system 130. This is an example of a workflow performed by the set of management tools 110. The computer resources being managed may include servers or components of servers, such as CPUs, memory, etc. Thus, the management tools 110a-d can manage machine configurations and/or resource allocations for machines.

Figure 2:
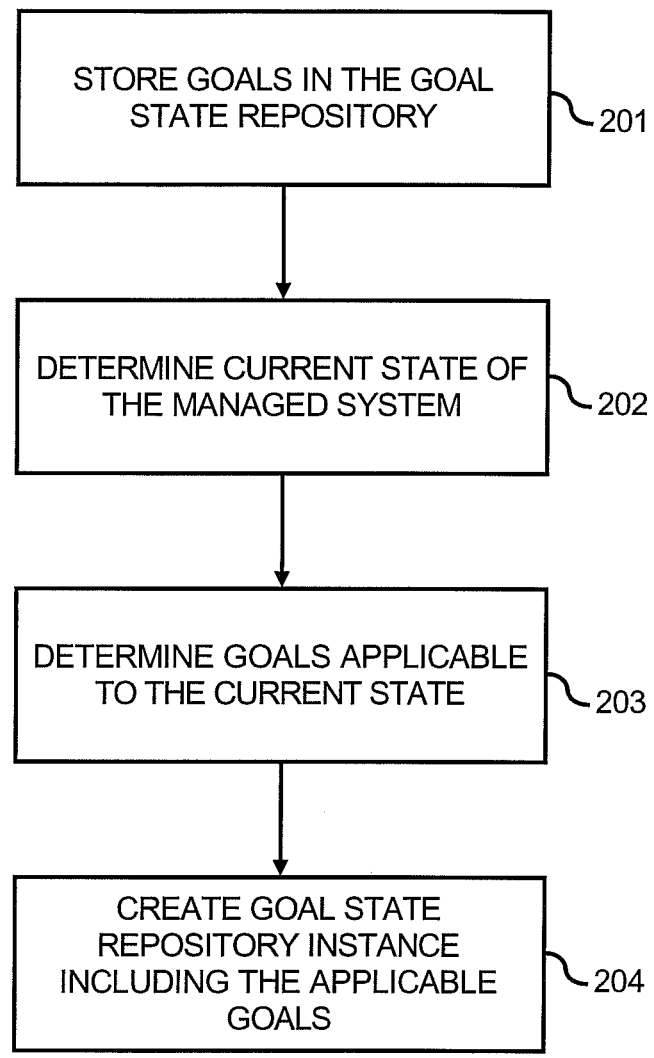
FIG. 2 illustrates a flowchart of a method for creating a global state repository instance, according to an embodiment.

FIG. 2 illustrates a flowchart of a method 200 for creating a global state repository instance, according to an embodiment. The method 200 is described with respect to FIG. 1 by way of example and not limitation.

At step 201, goals are stored in the goal state repository 101. For example, all the goals for the managed system 130 are stored in the goal state repository 101.

At step 202, the repository instance creation tool 120 determines the current state of the managed system 130. The current state may include the present time and conditions of the managed system 130. The monitoring tool 121 may measure metrics for the managed system 130 to determine its current state.

At step 203, the repository instance creation tool 120 determines the goals from the goal state repository 101 which are applicable to the current state, such as at a present time or under present conditions, of the managed system 130. The determined goals may be goals identified from the goal state repository 101 or calculated from current conditions of the managed system 130 or from stored goals. Determining applicable goals may include identifying goals that the managed system 130 is not in compliance with, for example, by comparing metrics to stored goals or identifying time sensitive goals that are applicable to the present time.

At step 204, the repository instance creation tool 120 creates the goal state repository instance 102 including the applicable goals determined at step 203. The goal state repository instance 102 is then used by the management tools 110 to manage and modify the managed system 130.

Figure 3:
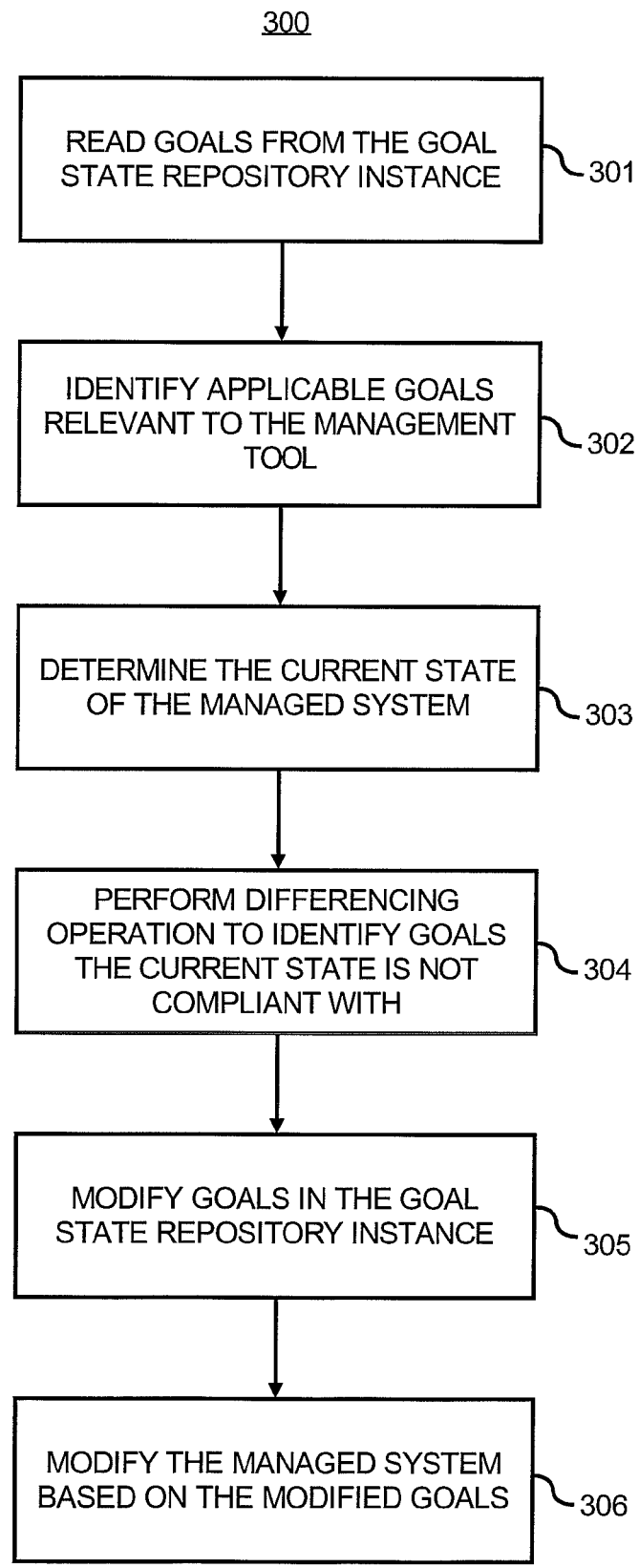
FIG. 3 illustrates a flowchart of a method for modifying a managed system to be in compliance with applicable goals, according to an embodiment.

FIG. 3 illustrates a flowchart of a method 300 for modifying a managed system to be in compliance with applicable goals, according to an embodiment. The method 300 is described with respect to FIGS. 1 and 2 by way of example and not limitation.

After the global state repository instance 102 is created, for example, using the method 200, the management tools 110 are used to manage and modify the managed system 130 to be in compliance with the applicable goals in the global state repository instance 102. The steps described below are steps that may be performed by any of the management tools 110 shown in FIG. 1. At step 301, a management tool reads the goals from the goal state repository instance 102.

At step 302, the management tool identifies the subset of the applicable goals in the global state repository instance 102 that are relevant to that management tool. For example, the management tool 110b identifies entries in the global state repository instance 102 that are relevant to the functions performed by that tool.

At step 303, the management tool determines a current state of the managed system 130. The repository instance creation tool 120 may determine the current state of the managed system 130 using the monitoring tool 121, and the management tool may determine the current state from the repository instance creation tool 120. In another embodiment, the management tool determines the current state of the managed system 130 by communicating with the managed system 130. Models may be used to specify the state of the system.

At step 304, the management tool performs a differencing operation to determine the goals that the current state of the managed system 130 is not compliant with. A model may be used to represent the current state and the goals so they can be quickly compared to identify differences. Upon determining a difference, the management tool may perform any combination of the following steps 305 and 306.

At step 305, the management tool modifies one or more goals in the goal state repository instance 102. The management tool may determine refinements to the goal state which should be satisfied by other tools. To do so, it creates, modifies or removes entries from the goal state repository instance 102. For example, the management tool 110a creates an entry in the goal state repository instance 102 indicating the type and quantities of compute resources needed to allow the managed system to be in compliance with goals.

At step 306, the management tool or another management tool in the workflow modifies the managed system 130 to allow the managed system to operate in compliance with the goals. For example, the management tool 110d may power on and configure a server for the management system 130 to operate in the manner defined by entries in the goal state repository instance 102 created or modified by the other management tools.

Figure 4:
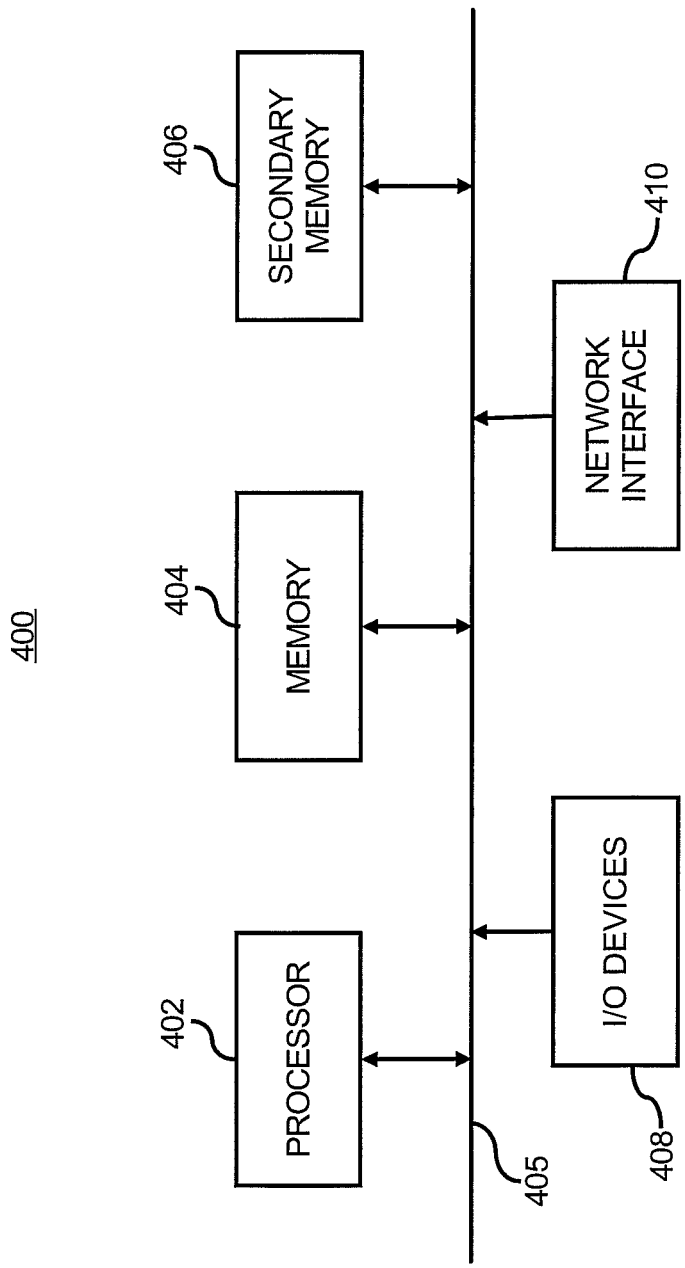
FIG. 4 illustrates a computer system, according to an embodiment.

FIG. 4 illustrates an exemplary block diagram of a computer system 400 that may be used as a platform for any of the tools shown in FIG. 1. The computer system 400 includes one or more processors, such as processor 402, providing an execution platform for executing software.

Commands and data from the processor 402 are communicated over a communication bus 405. The computer system 400 also includes a main memory 404, such as a Random Access Memory (RAM), where software may be resident during runtime, and a secondary memory 406. The tools described with respect to FIG. 1, such as the management tools 110, the repository instance creation tool 120 and the monitoring tool 121 may include software stored in the memory 104 during runtime and executed by the processor 402. Tools may only include software or a combination of hardware and software. The monitoring tool 121 may include sensors (not shown) for monitoring metrics.

The secondary memory 406 includes, for example, a hard disk drive and/or a removable storage drive, representing a floppy diskette drive, a magnetic tape drive, a compact disk drive, etc., or a nonvolatile memory where a copy of the software may be stored. The secondary memory 406 may also include ROM (read only memory), EPROM (erasable, programmable ROM), EEPROM (electrically erasable, programmable ROM).

A user interfaces with the computer system 400 with one or more I/O devices 408, such as a keyboard, a mouse, a stylus, display, and the like. A network interface 410 is provided for communicating with other systems.

One or more of the steps of the methods 200 and 300 and other steps described herein may be implemented as software embedded on a computer readable medium, such as the memory 404 and/or 406, and executed on the computer system 400, for example, by the processor 402. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method of managing a system to be compliant with applicable goals, the method comprising:
    automatically determining an applicable goal for a current state of a managed system from a goal state repository instance, wherein the applicable goal includes a metric to be achieved by the managed system;
    determining a measurement of the metric, wherein the measurement describes a current state of the managed system;
    determining whether the measurement of the metric is not in compliance with the the metric in the applicable goal;
    in response to determining the measurement of the metric is not incompliance, determining a difference between the metric in the applicable goal and the measurement of the metric; and
    modifying the metric in the applicable goal in the goal state repository instance based on the difference, wherein the managed system is modified based on the modified applicable goal stored in the goal state repository instance.

2. The method of claim 1, comprising:
    determining the current state of the managed system based on a present time or a current condition of the managed system determined from the measured metric of the managed system.

3. The method of claim 1, comprising:
    using a model to specify the current state of the managed system; and
    using the same model to describe applicable goals to the managed system, so the current state of the managed system is operable to be compared to the applicable goals.

4. The method of claim 1, further comprising:
    using a plurality of management tools to manage the managed system, wherein each of the management tools is responsible for a subset of applicable goals stored in the goal state repository instance.

5. The method of claim 4, wherein a workflow specifies functions for each of the plurality of management tools and a sequence of executing each of the plurality of management tools.

6. The method of claim 4, further comprising:
    a first management tool of the plurality of management tools reading a corresponding subset of the applicable goals from the goal state repository instance;
    the first management tool determining a difference between the current state of the managed system and the corresponding subset of the applicable goals for the first management tool; and
    the first management tool modifying the corresponding subset of the applicable goals based on the difference.

7. The method of claim 6, further comprising:
    a second management tool of the plurality of management tools modifying the managed system based on the modified subset of applicable goals.

8. The method of claim 1, further comprising:
    storing goals for managing the managed system in a goal state repository;
    determining goals from the goal state repository which are applicable to the current state of the managed system; and
    creating the goal state repository instance from the applicable goals.

9. The method of claim 8, wherein the goals stored in the goal state repository define objectives the managed system has been tasked with achieving.

10. The method of claim 9, wherein the goals vary for different times and different operating conditions.

11. The method of claim 8, wherein the goal state repository instance is a subset of the goals in the goal state repository.

12. The method of claim 8, further comprising:
    calculating goals to be stored in the goal state repository instance from the current state of the managed system.

13. The method of claim 8, further comprising:
    deleting the goal state repository instance in response to the managed system being modified based on the modified applicable goal.

14. A system for managing a managed system to be compliant with applicable goals, the system comprising:
    at least one processor;
    a goal state repository storing goals for a managed system;
    a goal state repository instance storing a subset of the goals applicable to a current state of the managed system, wherein the goal state repository instance is created by comparing the current state of the managed system to the goals stored in the goal state repository, wherein an applicable goal of the subset of goals includes a metric to be achieved by the managed system; and a plurality of management tools executed by the at least one processor to modify the managed system to be in compliance using the subset of goals stored in the goal state repository instance, wherein to modify the managed system, at least one of the plurality of management tools is to determine a measurement of the metric, wherein the measurement describes a current state of the managed system;

determine whether the measurement of the metric is not in compliance with the metric in the applicable goal;

in response to determining the measurement of the metric is not incompliance, determine a difference between the metric in the applicable goal and the measurement of the metric; and modify the metric in the applicable goal in the goal state repository instance based on the difference, wherein the managed system is modified based on the modified applicable goal stored in the goal state repository instance.

15. The system of claim 14, wherein each of the plurality of management tools operate on a subset of the applicable goals stored in the goal state repository instance based on a workflow.

16. The system of claim 15, wherein the workflow specifies functions for each of the plurality of management tools and a sequence of executing each of the plurality of management tools.

17. The system of claim 15, further comprising:
a repository tool creating the goal state repository instance from the goal state repository and deleting the goal state repository instance in response to the managed system being modified based on the modified applicable goal.

18. A non-transitory computer readable medium storing instructions that when executed by a processor perform a method of managing a system, the method comprising:

determining an applicable goal for a current state of a managed system from a goal state repository instance, wherein the applicable goal includes a metric to be achieved by the managed system;

determining a measurement of the metric, wherein the measurement describes a current state of the managed system;

determining whether the measurement of the metric is not in compliance with the metric in the applicable goal;

in response to determining the measurement of the metric is not incompliance, determining a difference between the metric in the applicable goal and the measurement of the metric; and modifying the metric in the applicable goal in the goal state repository instance based on the difference, wherein the managed system is modified based on the modified applicable goal stored in the goal state repository instance.

19. The computer readable medium of claim 18, comprising:
determining the current state of the managed system based on a present time or a current condition of the managed system determined from the measured metric of the managed system.

20. The computer readable medium of claim 18, wherein the method comprises:
storing goals for managing the managed system in a goal state repository;
determining the applicable goal from the goal state repository;
creating the goal state repository instance from the applicable goal; and
deleting the goal state repository instance in response to the managed system being modified based on the modified applicable goal.

* * * * *

UNITED STATES PATENT AND TRADEMARK OFFICE
CERTIFICATE OF CORRECTION

PATENT NO. : 8,825,610 B1
APPLICATION NO. : 11/829792
DATED : September 2, 2014
INVENTOR(S) : James C. Pruyne et al.

Page 1 of 1

It is certified that error appears in the above-identified patent and that said Letters Patent is hereby corrected as shown below:

In the Claims

Column 7, line 57, in Claim 1, delete "with the" and insert -- with --, therefor.

Signed and Sealed this
Third Day of February, 2015

Michelle K. Lee
*Deputy Director of the United States Patent and Trademark Office*